(12) United States Patent
Homburg et al.

(10) Patent No.: US 6,282,967 B1
(45) Date of Patent: Sep. 4, 2001

(54) APPARATUS FOR MEASURING THE THROUGHPUT OF MATERIAL ON A CONVEYER

(75) Inventors: Helmut Homburg, Harsewinkel; Klaus Kollmeier, Munster, both of (DE)

(73) Assignee: Claas Selbstfahrende Erntemaschinen GmbH, Harsewinkel (DE)

(*) Notice: Subject to any disclaimer, the term of this patent is extended or adjusted under 35 U.S.C. 154(b) by 0 days.

(21) Appl. No.: 09/244,289

(22) Filed: Feb. 3, 1999

(30) Foreign Application Priority Data

Jan. 26, 1998 (DE) ................................. 198 02 756

(51) Int. Cl.$^7$ ..................................................... G01F 23/00
(52) U.S. Cl. ............................................................. 73/861
(58) Field of Search ...................... 73/149, 861; 356/379, 356/380, 387

(56) References Cited

U.S. PATENT DOCUMENTS

| | | |
|---|---|---|
| 3,774,446 | * 11/1973 | Diehl . |
| 5,351,558 | 10/1994 | Horn et al. . |
| 5,560,246 | 10/1996 | Bottinger . |
| 5,708,369 | 1/1998 | Horn . |
| 5,750,877 | 5/1998 | Behnke et al. . |
| 5,795,221 | 8/1998 | Diekhans . |

FOREIGN PATENT DOCUMENTS

| | | | |
|---|---|---|---|
| 30 45 728 C2 | 7/1982 | (DE) | ............................. A01D/41/12 |
| 41 05 857 C2 | 8/1992 | (DE) | ................................. G01F/1/86 |
| 42 27 922 A1 | 2/1994 | (DE) | ................................. G01F/1/86 |
| 195 44 057 A1 | 5/1997 | (DE) | ............................. A01D/41/12 |
| 0 702 891 A1 | 8/1995 | (EP) | ............................. A01D/41/12 |

OTHER PUBLICATIONS

Behnke et al., Document with Ser. No. 08/755,962; Filed Nov. 1996.
Boettinger, Document with Ser. No. 08/751,873; Filed Nov. 1996.

* cited by examiner

Primary Examiner—Robert Raevis
(74) Attorney, Agent, or Firm—Husch & Eppenberger, LLC; Robert E. Muir; Kevin M. Kercher

(57) ABSTRACT

Apparatus measures the throughput of material being conveyed through a conveyer, wherein the conveyer blades carrying the material (in particular, cereal grains) are continuously moved in a conveyer shaft and a photoelectric device is mounted perpendicularly on the shaft. A light beam of a photoelectric device is aligned substantially parallel to the plane surfaces of the blades. A signal processor determines the distance between the top edge of the material and the passing blade carrying this material from the light-dark periods of the signal. By taking into account the spacing of the blades, the thickness of the blades, and the cross-sectional area of the shaft, the signal processor then determines the apparent volume of material on each blade. Further measuring devices are connected to the signal processor and the inclination and/or shape of the material surface is determined via signals from the measuring means. An average depth of the material is calculated based upon the orientation and position of the surface relative to the light beam. A highly accurate volume of the material on each blade is thereby determined.

24 Claims, 3 Drawing Sheets

APPARATUS FOR MEASURING THE THROUGHPUT OF MATERIAL ON A CONVEYER

BACKGROUND OF THE INVENTION

The present invention relates generally to agricultural machinery and, more particularly, to improvements for measuring the throughput of material on conveyors.

The invention specifically relates to an apparatus for measuring where the conveyer blades carrying the material (in particular, cereal grains) are continuously moved in a conveyer shaft. A photoelectric device is mounted on the shaft so that its light beam is aligned substantially parallel to the preferably flat surfaces of the blades. A signal processor determines the distance between the top edge of the material and the passing blade carrying the material from the light-dark periods of the signal. The signal processor determines the apparent volume of material on each blade, taking into account the spacing of the blades, the thickness of the blades, and the cross-sectional area of the shaft.

An apparatus of this general type is known from German patent 30 45 728 C2. Conveyer blades carrying the harvested material (in particular, cereal grains) are aligned approximately perpendicularly to the walls of a rectangular conveyer shaft. An endless chain continuously pulls the conveyor blades through the shaft. The surface of the layer of grain on the blade is approximately horizontal. The shaft is mounted on a combine harvester and is usually inclined to the vertical in the plane of the chain. A photoelectric device is mounted in parallel with the blades and is effective between the side walls of the shaft. The dark period of the light beam for the pass of each loaded blades is measured. The height of the load is determined, taking into account the dark period due to the thickness of the blade itself. The volume of grain being conveyed is determined by multiplying the height by the area of the shaft or a function of the shaft geometry. This apparatus only works relatively accurately when the combine harvester is on a horizontal surface so that the conveyer is in its normal position and when the blades are sufficiently full. However, if the conveyer is transversely or longitudinally inclined relative to its normal position, such as when it is being moved on a slope or at different loadings of the grain tank or when crossing loose earth, its operation is impaired and the computed result is extremely inaccurate. Under such circumstances, the measurement of the volume of grain being conveyed is usually too high.

Furthermore, it is known from German patent 195 44 057 A1 that in order to correct the weight of corn being conveyed in an inclined conveyer, where the weight is being systematically underestimated by a weighing sensor, one may calculate the true quantity of conveyed corn by means of a signal from an inclinometer functioning in two directions. However, this weighing apparatus for the conveyer is complex and the need to decouple the drive mechanism therefrom is also technically complex.

Moreover, it is known from European patent 0 702 891 A1 to associate location data, speed signals and throughput time constants with continuously measured amounts in a harvesting machine so as to establish a harvesting cadastre. Here, one falls back on stored or externally defined standard litre-weights with respect to average quality and average moisture content for the different sorts of cereals. The harvest production performance and the relative losses associated therewith are continuously displayed on an indicator.

An object of the present invention is overcome one or more of the deficiencies noted above.

Another object is to provide an improved measuring apparatus having improved accuracy.

Still another object is to provide an improved apparatus of the type described and having a simplified construction.

SUMMARY OF THE INVENTION

In accordance with the present invention there is provided a conveyer for harvested crops having an apparatus for measuring the throughput of material being conveyed through the conveyer, conveyer blades for carrying the material, means for continuously moving the blades in a conveyer shaft, a first photoelectric device mounted so that its light beam is aligned substantially parallel to the surfaces of the blades, a processor for determining the distance between the top edge of the material and the passing blade carrying the material from the light-dark periods of the signals, said processor taking into account the spacing of the blades and thickness of the blades and determining the apparent volume of the material on each blade from said distance and the cross-sectional area of the shaft, sensing means for emitting a photoelectric beam for sensing the orientation and position of the surface of the material on a conveyor blade relative to the light beam and for sending the same to the processor, and the processor being operative to determine the inclination and shape of the surface of the material on a conveyor blade and the volume of the material being conveyed.

The object of the present invention is achieved by connecting sensing means to the signal processor which then determines the inclination and/or shape of the surface of the material via the signals from said further measuring means and finally determines the exact volume of the material being conveyed, depending upon the orientation and position of the surface relative to the light beam.

To accurately determine the volume, the volume measurement effected by the photoelectric device is corrected, taking into consideration the inclinations of the grain surface relative to the surface of the blade both in the direction of the test beam and the direction perpendicular thereto. For this purpose, the inclinations are determined using additional photoelectric devices or separate inclinometers or a combination of the both.

A first advantageous grain volume measuring apparatus is equipped with three photoelectric devices, one of which is located exactly in the middle between two opposite side walls. The other two photoelectric devices are arranged at right angles to the first and are located near the edges of the shaft. Preferably all three photoelectric devices are located at the same height. Any swaying of the shaft exclusively about the axis of the first, central light beam has no effect upon the dark-time or depth measurement, i.e., the period of time between the passing of the base of the blade and the top surface of the grain. The other two photoelectric devices indicate an equal rim level of the grain, which is greater than the relevant depth measured by the first photoelectric device, which depends upon the amount of sway and the half width of the shaft.

If, however, the shaft should only sway about the axis of the other light beams then the inclination will be given by the differing dark-time or depth signals caused thereby in relation to the spacing between the photoelectric devices. The relevant central height of the grain with respect to the half width of the shaft can then be easily determined from the maximum length of the rim as measured by the first photoelectric device and the aforesaid inclination.

If the shaft is inclined differently about the axes of both photoelectric devices, the relevant height of the grain surface needed for determining the volume is likewise given by the length of the rim as measured by the first photoelectric device but reduced by the difference in the length of the rim up to the center of the shaft caused by the inclination. The difference corresponds to the inclination determined by the other two photoelectric devices in relation to the half width of the shaft.

If the two parallel photoelectric devices for determining the inclination are mounted at a spacing corresponding to half the width of the shaft, then no additional conversion is required since the measured difference in length can be deduced directly from the length measured by the first photoelectric device for obtaining the relevant average length.

If, however, the two parallel photoelectric devices are spaced apart by more than half the width of the shaft, then the measurements are more accurate. However, the accuracy of the measurements may be reduced if the photoelectric devices are too close to the side walls. This is because the grains near the side walls are held back by friction, causing the level at the edges to be somewhat sunken. Should the dimensions of the grain be smaller than the gap between the edge of the paddle and the side wall, then there will be a continuous loss of grain at the edge during the conveying process.

Thus, the parallel photoelectric devices produces a train of signals from which an inclination signal is obtained, which can then be used for other functions of the harvesting machine. For example, counterbalancing the inclination effect when sieving, facilitating steering on a slope or providing additional control when loading the harvested material onto a transporter moving in parallel therewith.

Furthermore, the inclination in the second direction, preferably along the length of the harvesting vehicle, can be determined from the three heights measured provided the level of the highest side edge of the grain, as measured by the parallel photoelectric devices, is extrapolated to the highest level occurring in the corner. The difference between this corner level and the level measured by the single photoelectric device on the other side wall at the center thereof is then formed and set with respect to the width of the shaft. This inclination value can also be used elsewhere in the harvesting machine, e.g., for controlling the power of the engine or regulating the speed.

In an analogous manner, an inclination value from an independent inclinometer can also be used for correcting the level measurement produced by the single photoelectric device. Only one correction is needed if the single photoelectric device is located centrally relative to the side wall and the inclination relative to the photoelectric device is measured about a horizontal perpendicular axis.

If the single photoelectric device is located away from the direction in which the blade protrudes from the transporting chain, any sagging of the blade due to increased loading will not affect the accuracy of the measurement, provided the photoelectric device is arranged centrally of the blade section. This is due to the fact that the cross-section of the grain volume from the center height and the shaft width does not vary relative to the inclination of the cover surface or the inclination of the blade surface in relation to the direction of measurement i.e. the forward direction of the conveyer.

The above description applies only in the case of a normally loaded blade where it is fully covered. In the case where the loading is incomplete, there will be small volumes of oblique sectioned pillars extending in the forward direction of the conveyer as well as prisms and pyramids whose edges correspond to the inclination of the shaft. To determine such relatively small quantities, it is advantageous if the photoelectric devices can detect the level of the highest edge. If the photoelectric devices of the photoelectric device pair are located close to the side walls, at least one of the light beams will detect even the smallest residual amount.

However, it is then only possible to estimate the volume when the measured values are derived from residual amounts that have been captured by only one or two photoelectric devices. If suitable external inclination signals are available, then the residual volume can be immediately calculated from the highest depth value in combination with the position of the relevant photoelectric device and the inclination signals together with the geometry of the shaft and the blade. If no external inclination signals are available, then the inclination values obtained previously from adequately loaded blades are used after being extrapolated in time. Non-rectangular shafts and uneven blade surfaces should be taken into account when determining the volume.

Checking and calibrating the photoelectric device signals is accomplished by correlating the spacing of the successive blades in time with the light and dark periods. Thus, the measured dark period should always be set in relation to the total length of a light-dark period and the relatively dark period for the blade subtracted therefrom to obtain the height value in relation to the spacing of the blades.

An increase in accuracy can be achieved through the parallel use of the inclination values obtained from the photoelectric device signals and the external generated inclination value. The mutually appertaining values are averaged or an appropriate selection is made therefrom if one of the measurements seems to be distorted.

The precision in the measurement of the shape and position of the surface of the corn is obviously greater than an averaged determination thereof by means of the signals from inclinometers and accelerometers since the surface of a bulk material does not normally alter its position at the angle of repose but only readjusts itself if this is exceeded or if there is some dynamic excitation. The constant friction of the bulk material against the walls of the shaft when being conveyed does however cause the grains to slowly form an even surface which is perpendicular to the overall acceleration vector inclusive of the gravitational vector. Consequently, it is advantageous that the wall of the shaft be lightly contoured to provide a scraping profile at least just prior to entry into the test area and/or to create a vibrational movement in the passing blade, near its attachment to the chain for example, by appropriate displacement of the chain guide into the grain.

If the photoelectric device is mounted in the upper part of the conveyer shaft so that the grain surface is leveled during the climb and loss of grain at the edges of the blade is virtually excluded during subsequent movement, then one should take into account that relatively high acceleration of the shaft will occur when driving over uneven ground. The acceleration usually differs from that recorded by an inclinometer and accelerometer located close to the ground.

Another way of increasing accuracy and redundancy is provided by increasing the number of photoelectric devices and distributing them in appropriate manner over a plane. By evaluating the signals from a plane of adjacent photoelectric devices, the contour of the grain surface can also be determined and the volume taken into account or an inclined average level be determined. The photoelectric devices in the corner regions also permit the smaller volumes present on blades that are not quite fully covered to be determined precisely without using external or extrapolated inclination values. The inclination of the levels are derived from the signals from the adjacent sensors still being temporarily darkened.

The information usually available in a harvesting machine computer regarding the type and moisture level of the material being harvested can be utilized via a correlation function stored in tabular manner to provide a shaping function for correcting the volume due to any unevenness of the surface in the prevailing circumstances.

Since the contour of the surface is very coarse, due to the grainy nature of the harvested material, and the diameter of corn grains, beans, peas, etc. can sometimes reach a size of almost 1 cm, it is advantageous to produce an average for the position of the edge by suitable selection of the diameter of the light beam for the purpose of producing reproducible values. The light beam should simultaneously embrace a plane of grains or objects. An empty blade should fully darken the photoelectric device because is has a rim of sufficient height.

To keep the adverse effects of alterations or dirtying of the light beam path on the accuracy of the measurements as low as possible, it is advantageous to store the maximum brightness signal and the minimum dark signal and to define the detection threshold for the transitions used for determining the lower and upper positions of the edge as some average between these extreme values.

The photoelectric devices may have a two part construction with the light emitter and the receiver being located on opposite sides of the shaft or they may be arranged in pairs on a reflector aligned at the opposite side, thus simplifying the mounting process.

BRIEF DESCRIPTION OF THE DRAWINGS

Reference is made to the drawings which illustrate the best known mode of carrying out the invention and wherein the same reference characters indicate the same parts throughout the several views.

DETAILED DESCRIPTION

Figure 1:
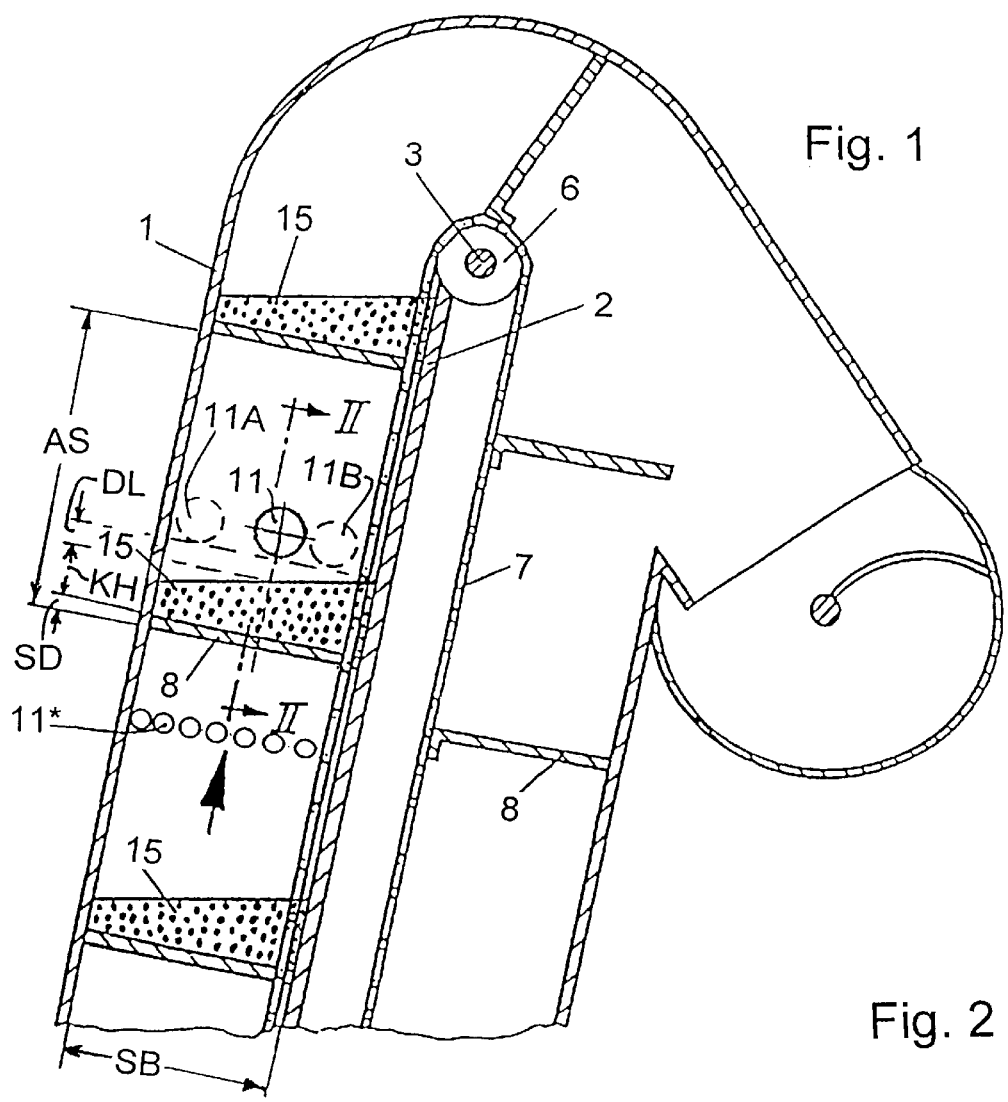
FIG. 1 is a longitudinal section through a conveyer shaft.

FIG. 1 shows the upper section of an open ended conveyer. Blades 8 are drawn up through the shaft by a chain 7 passing over a sprocket 6 on an upper pulley 3. From this pulley, the blades 8 then move downwardly. The blades 8 carry the harvested material 15, especially in the form of grains, upwardly through the shaft and then discharge it in the upper region after they have reversed direction. The individual volumes of grain on the blades are surrounded by an outer wall 1, side walls 4 and 5, and an inner partition wall 2. A photoelectric device includes an infrared source 11 which is mounted on side wall 4 so that its light beam (shown by arrows in FIG. 2) extends in parallel with the passing blades 8. The photoelectric device 11 is preferably located centrally on side wall 4 midway between the inner wall 2 and the outer wall 1.

Figure 2:
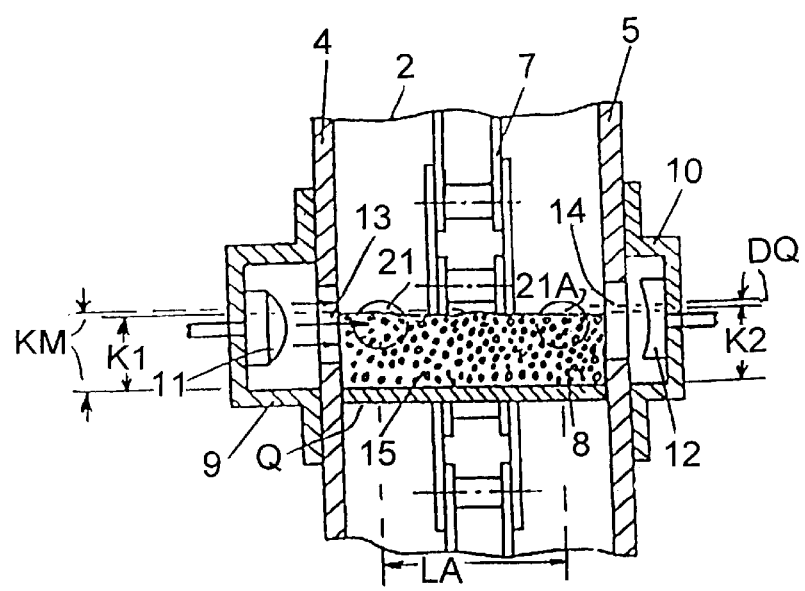
FIG. 2 is a fragmentary longitudinal section taken generally along line II—II of FIG. 1.

As shown in FIG. 2, further photoelectric devices 21, 21A are located on the inner wall 2 advantageously in the same plane of the shaft as the first photoelectric device 11 or, alternately, slightly displaced in the forward direction of the conveyer. Their light beams are mutually parallel and extend across the light beam from the first photoelectric device 11 in the forward direction of the conveyer; or these light beams may be slightly displaced as aforesaid. The beams from the photoelectric devices 11, 21, 21A form a photoelectric barrier. This term should be understood to mean a plurality of light beams, conveniently three and advantageously more in number, as hereafter described.

As one can appreciate, a start light signal is produced in the single photoelectric device 11 each time the lower edge of a blade 8 has just passed by. When the conveyer speed is substantially constant, the time period between the start edges of the light signals, represents a measure of the spacing AS of the flights of the blades 8. The dark periods occurring when the grain 15 and a blade 8 pass by are compared with this spacing to determine the relative height KH of the load together with the thickness SD of the blade 8. If the surface of the grain is level and parallel to the light beam from the photoelectric device 11, the required volume of the grain is obtained from the load height KH and the cross-sectional area of the shaft. Any inclination of the blade 8 relative to the shaft and any inclination of the shaft from the vertical about the light beam will have no effect upon the determination of this volume.

A further increase in accuracy is obtained by evaluating the shape of the surface using a multiplicity of parallel photoelectric devices 11* (see FIG. 1) instead of just one photoelectric device 11. The contour of the surface from whose shape the volume of the contoured part of the load is determined is obtained from the differing pass times of the grain and more particularly from the differing periods of darkness.

FIG. 2 shows a section II—II through the conveyer shaft. The side walls 4 and 5 on which the parts of the photoelectric device i.e. the infrared source 11 and a photodetector 12 are mounted can be seen in section. The parts 11, 12 of the photoelectric device are surrounded externally by a protective housing 9, 10 and located behind windows 13, 14 which are flush with the inner face of the walls 4, 5.

The cross-section of the light beam from the photoelectric device 11 and the area covered by the reception characteristic of the sensor are preferably-both greater than the objects, i.e., the grains being conveyed. Thus, the signal obtained for determining the light-dark transition is as accurate as possible.

Moreover, the two further photoelectric devices 21, 21A on each side of the conveyer chain 7 can be seen. They are located in close proximity to the side walls 4, 5 although slightly spaced therefrom. Furthermore, their light beams are in the same plane as the light beam from the first photo-electric device 11. The start of the individual dark signals will thereby indicate the position of the highest edge of the load K1, K2 in the area covered by the light beams. The difference in time or the spatial difference DQ between the edge positions K1, K2 relative to the spacing LA between the photoelectric devices indicates the size of the transverse inclination of the level in the shaft.

In addition, the size of the longitudinal inclination relative to the half width of the shaft SB is provided by the difference DL (FIG. 1) between the average value KM of the exact edge positions K1, K2 and the edge position in the area covered by the first photoelectric device 11.

Figure 3:
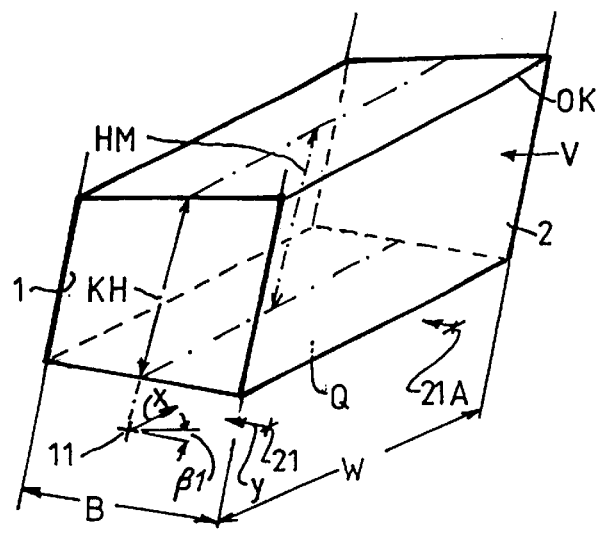
FIG. 3 is a schematic illustration of a grain volume inclined about a first axis.
Figure 4:
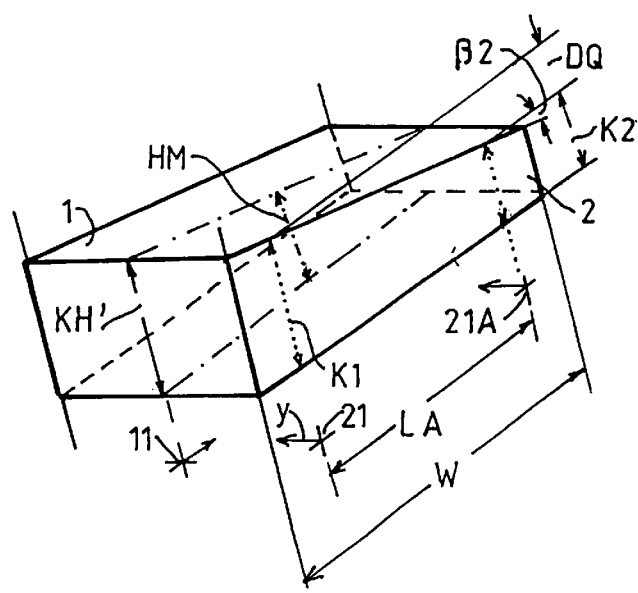
FIG. 4 is a schematic illustration of a grain volume inclined about a second axis.
Figure 5:
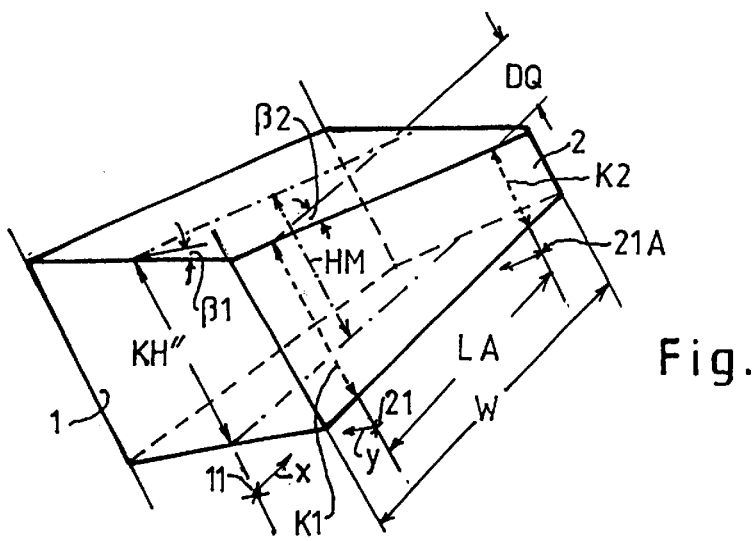
FIG. 5 is a schematic illustration of a doubly inclined grain volume.

The use of the two above-mentioned inclinations for precisely determining the volume is depicted in FIGS. 3, 4 and 5. If the blade is fully covered with material and its surface is substantially flat, then the volume of material is always obtained by multiplying the cross-sectional area Q of the shaft by the load height HM at the center of the blade. Thus, the volume determination depends upon the steps of measuring the local load height with one of the photoelectric device signals and determining the central load height HM at the center of the blade by means of the inclinations determined from the dispositions of the other photoelectric devices relatively to the first and the edge position signals obtained therefrom.

FIG. 3 shows schematically a grain volume in a shaft having a rectangular cross-section Q, a breadth B and width W. The surface is flat and horizontal. The front and rear walls 1, 2 of the shaft are tilted only about the axis X of the photoelectric device 11 through an angle $\beta 1$. The volume passes through the photoelectric device 11 centrally of the shaft breadth so that, after subtracting the dark period for the thickness of the blade, the load height KH is given by dark period relative to the periodic time. The two photoelectric devices 21, 21A extending between the inner and outer walls indicate the start of the dark phase at practically the same time because the upper edge OK passes each photoelectric device 11 simultaneously. This indicates that there is no tilt about the Y axis of the shaft and that the load height KH measured by the first photoelectric device 11 will also be the central load height HM at the center of the blade.

FIG. 4 shows a grain volume in the shaft tilted about the Y axis and with two photoelectric devices 21, 21A in parallel. In this case, the edge positions K1, K2 detected by the two photoelectric devices differ and the difference DQ between these positions in relation to the half spacing LA of the photoelectric devices provides the tilt angle $\beta 2$. The excess tilt therefore has to be corrected and subtracted from the maximum side Id height KH' measured by the single photoelectric device 11 in order to obtain the central load height HM. This results in HM=KH'-(DQ*W)/(LA*2), which represents the difference between the side load height KH' and the tilt angle $\beta 2$ times half the width W.

FIG. 5 shows a grain volume in the case of a shaft which is tilted about two axis X, Y by respective angles $\beta 1$, $\beta 2$. The tilt angle $\beta 2$ relatively to the half spacing LA of the photoelectric devices 11 is again given by the difference DQ between the edge positions K1, K2 on the inner or outer wall 1, 2. As one can easily see, the average load height HM has to be calculated in this case too by reducing the side load height KH" measured by the single photoelectric device 11 by the tilt angle $\beta 2$ relatively to half the width W so that the previous equation becomes HM=KH"-(DQ*W)/(LA*2). This equation also applies to FIG. 3 because the correcting term there is zero.

It is easy to see that other arrangements of the photoelectric devices, tilting of the blade relative to the shaft and not fully covering the blade are to be taken into account for easily determining the volume in a similar manner.

The arrangement of photoelectric devices 11 chosen here has the advantage of capturing the surface data almost simultaneously so that scarcely any shifting of the surface can occur during the relatively short time period in which each of the three dark signals begin.

It is apparent that the calculation of the central load height HM should be made just as easily with the help of external obtained tilt signals $\beta 1$, $\beta 2$ and a load height measuring signal KH". However, the problems of differing accelerations in the inclinometer and in the test area of the shaft as well as any delayed settlement in the level of the grain when the acceleration vector is displaced are all problems that must be recognized when calculating the central load height HM. If such problems exist in a particular instance, a correction has to be made.

Figure 6:
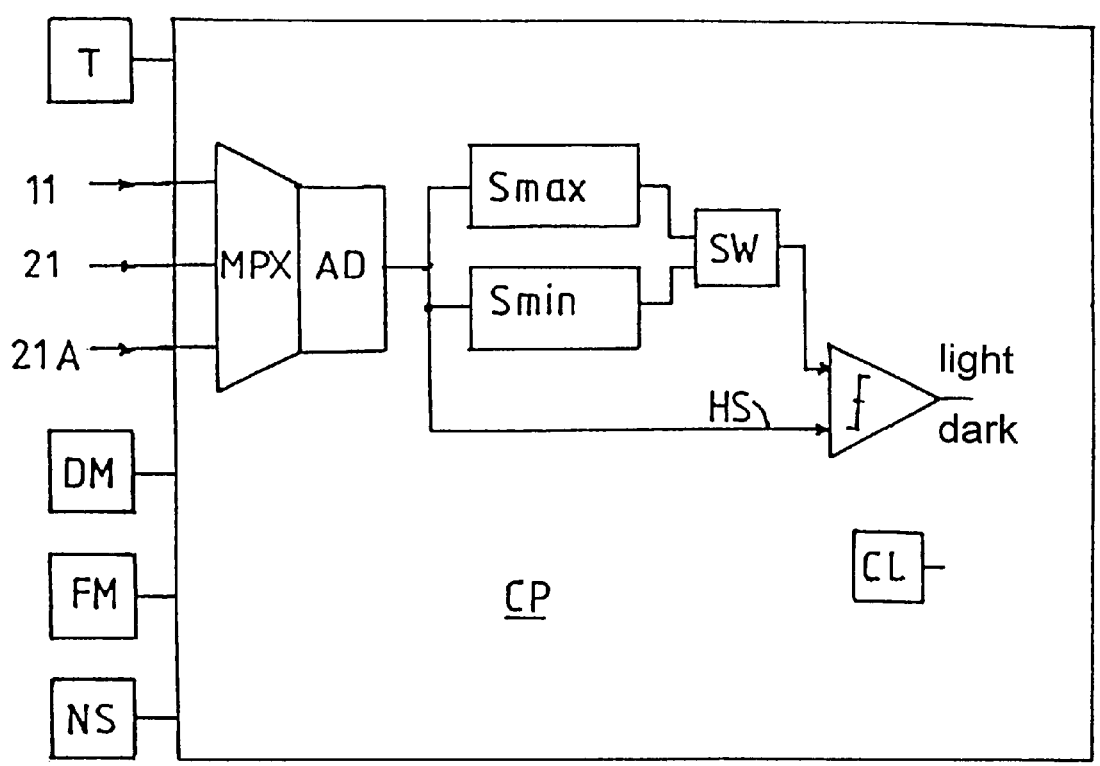
FIG. 6 is a block diagram of a circuit for a measuring apparatus embodying the invention.

FIG. 6 shows a block diagram of the circuit of the apparatus. It consists of a programmable processor CP to whose input signals are supplied from the photoelectric device receivers 21, 21A, 11 and which is also fed, as necessary, with data relating to the product being conveyed such as the weight, moisture content and type of cereal. This can be done in a known manner using a data bus, a communications system, a keyboard or by means of sensors, especially, a densitometer DM and a moisture gauge FM.

The incoming photoelectric device signals are evaluated in respect of the duration of their light and dark phase and/or their relative position in time and mutual duration by means of the clock signals from a clock pulse generator CL. As indicated above, these are converted over a long period into data regarding the rate of flow and the total quantity using the stored geometrical data concerning the shaft and the density and moisture values. The data is continuously used or outputted for determining the yield per unit area and for mapping this yield and may be displayed for the user.

If less than three of the photoelectric devices shown are available, then at least one accelerometer/inclinometer NS is connected to the input and the signal therefrom is used in the manner described above for correcting the cereal height measurement or for calculating the volume. The problem of tolerance in the angle of repose that causes inaccuracies and distortions in the volume then arises. This can be reduced by the advantageous use of correcting values that are obtained empirically by measurement or which are stored in tabular or functional form in dependence on the type of cereal and its relatively humidity.

If, as illustrated, an apparatus is provided with at least three photoelectric devices 21, 21A, 11 as well as at least one inclinometer NS for determining the tilt of the light beam, then the correcting factors arranged by size for the varying conditions, especially after a change in the tilt, can be determined by comparing the results obtained for the volume as determined by means of the signals from the plane of photoelectric devices 11, 21, 21A with the volume as determined by means of the signals from one photoelectric device 11 and the inclinometer NS. These correcting factors are utilizable in tabular or functional form and are used for simpler apparatus having only a few photoelectric devices and an inclinometer NS available.

The photoelectric device signals are supplied directly in analog form to an analog-digital converter AD where they are digitalized, the signals being periodically and successively sampled over a multiplexer MPX. In order to ensure the highest possibly accuracy when determining the times of the passing blade edges and the boundaries of the grain, the maximum and minimum light signal values from the individual photoelectric devices are recorded continuously. A threshold value midway between these values is determined for each photoelectric device. The transition of a photoelectric device signal from dark to light or vice versa is denoted by its passage through this threshold and the appertaining time point is recorded. The production of the threshold value and the comparison with the threshold value may of course be effected in the analog domain and the digital signal then occurring in the comparator can then be supplied to a digital input of the evaluating device. The processing of the signals is illustrated schematically for one of the signals. Here, the most recent maximum value is referenced Smax and the most recent minimum value is referenced Smin. The average threshold value obtained therefrom is referenced SW. This is compared with the internal signal HS at short intervals and the state, light or dark, is then the result of this comparison.

Two parallel photoelectric devices 11A, 11B may be provided as an alternative or in addition to the central single photoelectric device 11, as indicated in FIG. 1. Their signals may be used, after they have been averaged, in the same way as the signal from a single photoelectric device 11. In addition, it is advantageous to measure the course of the lower edge of the blade and thus determine its inclination when one wants to determine the small volume present on a blade that is not completely covered. If the photoelectric device arrangement comprises two pairs of photoelectric devices 11A, 11B; 21, 21A then the redundancy provided by the four height signals gives rise to the advantageous ability to obtain twice the number of volume determinations and to then determine the average.

Other objects, features and advantages will be apparent to those skilled in the art. While preferred embodiments of the present invention have been by way of illustration and the invention should not be limited except as required by the scope of the appended claims.

We claim:

1. In a conveyer for harvested crops having an apparatus for measuring the throughput of material being conveyed through the conveyer, conveyer blades for carrying the material, means for continuously moving the blades in a conveyer shaft, a first photoelectric device mounted so that its light beam is aligned substantially parallel to the surfaces of the blades, and a processor for determining the distance between the top edge of the material and the passing blade carrying the material from the light-dark periods of the signals, said processor taking into account the spacing of the blades and thickness of the blades and determining the apparent volume of the material on each blade from said distance and the cross-sectional area of the shaft; the improvement comprising:

sensing means for emitting a photoelectric beam for sensing the orientation and position of the surface of the material on a conveyor blade relative to the light beam and for sending the same to the processor, and the processor being operative to determine the inclination and shape of the surface of the material on a conveyor blade and the volume of the material being conveyed.

2. A conveyer according to claim 1, wherein said sensing means includes a pair of mutually parallel photoelectric devices arranged at right angles to the first photoelectric device.

3. A conveyer according to claim 2, wherein the processor determines the inclination of the surface of the material via test signals from said sensing means from the respective periods of time between their light-dark, transitions in a direction related to the spacing between the photoelectric devices.

4. A conveyer according to claim 2, wherein a correcting value proportional to half the width of the shaft is then formed from said inclination and an average depth of the material is formed therewith from the material top edge depth determined by means of the other photoelectric device.

5. An apparatus according claim 2, wherein said photoelectric devices in the photoelectric pair are each located adjacent a side wall parallel thereto.

6. A conveyer according to claim 1, wherein at least one of said sensing means an acceleration sensor.

7. A conveyer according to claim 1, wherein at least one of said sensing means is an inclination sensor.

8. A conveyer according to claim 1, wherein said photoelectric device serving to sense the height of the top edge of the material is located centrally relative to the section of the shaft and between those walls of the shaft which are perpendicular to the blades, regardless of the actual throughput of material.

9. A conveyer according to claim 1, wherein at least two photoelectric devices sense the respective individual edge heights in the vicinity of the respective photoelectric device in dependence on their respective positions, and the processor determines the center height, relative to the cross-section taken with respect to the sides of the shaft adjacent to which they are located, of the top edge of the material by averaging said individual edge heights.

10. A conveyor according to claim 1, wherein the inclination of the blades, which is used in the determination of the volume of said material is determined by means of said first photoelectric device and are outputted if necessary.

11. A conveyer according to claim 1, wherein the inclination of the edge depth of said material, which is used in the determination of the volume of said material is determined by means of said first photoelectric device and are outputted if necessary.

12. A conveyer according to claim 1, wherein two of said first photoelectric device are located near the respective adjacent side wall in parallel therewith.

13. A conveyer according claim 1, wherein the light beam from said photoelectric device has a diameter which is greater than the cross-section of the largest element being conveyed.

14. A conveyer according to claim 1, wherein the momentary intensity of a photoelectric signal is compared with an average value from a previously stored maximum intensity and a minimum intensity for determining the time point of the light-dark transition and the dark-light transition.

15. A conveyer according to claim 14, wherein the amounts by which said momentary intensity of a photoelectric signal deviates from said average value is used for determining the time point of the transition.

16. A conveyer according to claim 1, wherein the edge depth of said material in combination with the inclination of the blade and the geometry of the shaft are checked to see whether the blade is fully covered with material and the volume of said material is determined by calculating the corresponding pyramid- and prism-volumes composed therefrom if said blade is not fully covered with said material.

17. A conveyer according to claim 16, wherein the volume of said material is estimated by extrapolation if the information resulting from the determination of said volume is insufficient.

18. A conveyer according to claim 1, wherein a surface-shaping correcting value for correcting the raw figure that has been calculated for the volume of said material and for minimizing tolerance errors in the angle of repose is determined following any change in the inclination precipitated by acceleration values obtained from a grain-type register.

19. A conveyer according to claim 1, wherein, a surface-shaping correcting value, for correcting the raw volume calculation for said material and also for minimizing tolerance errors in the angle of repose, is determined following any change in the inclination precipitated by moisture content values obtained from a grain-type register.

20. A conveyer according to claim 1, wherein said blades are exposed to a vibration guide means just prior to entering the area covered by said photoelectric device for the purposes of reducing tolerance errors in the angle of repose.

21. A conveyer according to claim 1, wherein the walls of said shaft are designed so as to impede said material to thereby reduce errors in the angle of repose.

22. A conveyer according to claim 1, wherein a multiplicity of parallel photoelectric devices are arranged in at least one direction for obtaining the contour of the surface from the relative durations of their dark signals and said contour is taken into account when determining the volume.

23. A conveyer according to claim 1, wherein the photoelectric device includes a light emitter and a light receiver located opposite to one another on different walls of the conveyor shaft.

24. A conveyer according to claim 1, wherein the photoelectric device includes a light emitter and a light receiver arranged adjacent to one another, and a reflector aligned at the opposite wall of the shaft.

* * * * *